US012612069B2

(12) United States Patent
Kang

(10) Patent No.: US 12,612,069 B2
(45) Date of Patent: Apr. 28, 2026

(54) AUTONOMOUS DRIVING CONTROL APPARATUS AND METHOD THEREOF

(71) Applicants:Hyundai Motor Company, Seoul (KR); Kia Corporation, Seoul (KR)

(72) Inventor: Dong Hoon Kang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 105 days.

(21) Appl. No.: 18/437,543

(22) Filed: Feb. 9, 2024

(65) Prior Publication Data

US 2025/0136141 A1      May 1, 2025

(30) Foreign Application Priority Data

Oct. 31, 2023    (KR) ........................ 10-2023-0148145

(51) Int. Cl.
*B60W 60/00*        (2020.01)
*B60W 50/02*        (2012.01)

(52) U.S. Cl.
CPC ...... *B60W 60/001* (2020.02); *B60W 50/0205* (2013.01); *B60W 2050/0215* (2013.01); *B60W 2555/20* (2020.02)

(58) Field of Classification Search
CPC ........... B60W 60/001; B60W 50/0205; B60W 2555/20; B60W 2050/0215
See application file for complete search history.

(56) References Cited

U.S. PATENT DOCUMENTS

| | | | |
|---|---|---|---|
| 9,812,011 B1 * | 11/2017 | Stenneth | .......... G08G 1/096741 |
| 2019/0077411 A1 * | 3/2019 | Oishi | ........................ B60L 3/00 |
| 2020/0031297 A1 * | 1/2020 | Foltin | ................. B60W 50/029 |
| 2020/0180650 A1 * | 6/2020 | Lee | ........................ B60W 50/14 |
| 2021/0053569 A1 * | 2/2021 | Censi | ................... G08G 1/0112 |
| 2023/0112878 A1 * | 4/2023 | Hiramatsu | ............. G06V 20/58 |
| | | | 382/104 |
| 2023/0150496 A1 * | 5/2023 | Barrett | ................. B60W 40/02 |
| | | | 701/93 |
| 2023/0195107 A1 * | 6/2023 | Winter | ................... G06V 20/70 |
| | | | 701/2 |
| 2023/0221728 A1 * | 7/2023 | Iwase | ..................... G06V 20/56 |
| | | | 701/50 |

* cited by examiner

*Primary Examiner* — Mohamad O El Sayah
(74) *Attorney, Agent, or Firm* — Slater Matsil, LLP

(57)        ABSTRACT

An embodiment of an autonomous driving control apparatus includes a sensor device, a memory, and a controller. The autonomous driving control apparatus may obtain sensor performance verification information based on identification information of at least one object identified using the sensor device, obtain driving performance verification information including internal information of a host vehicle, external information of the host vehicle, geographic information of the host vehicle, driving information of the host vehicle, or any combination thereof, and adjust at least one control parameter for driving control of the host vehicle based on the sensor performance verification information and/or the driving performance verification information.

17 Claims, 7 Drawing Sheets

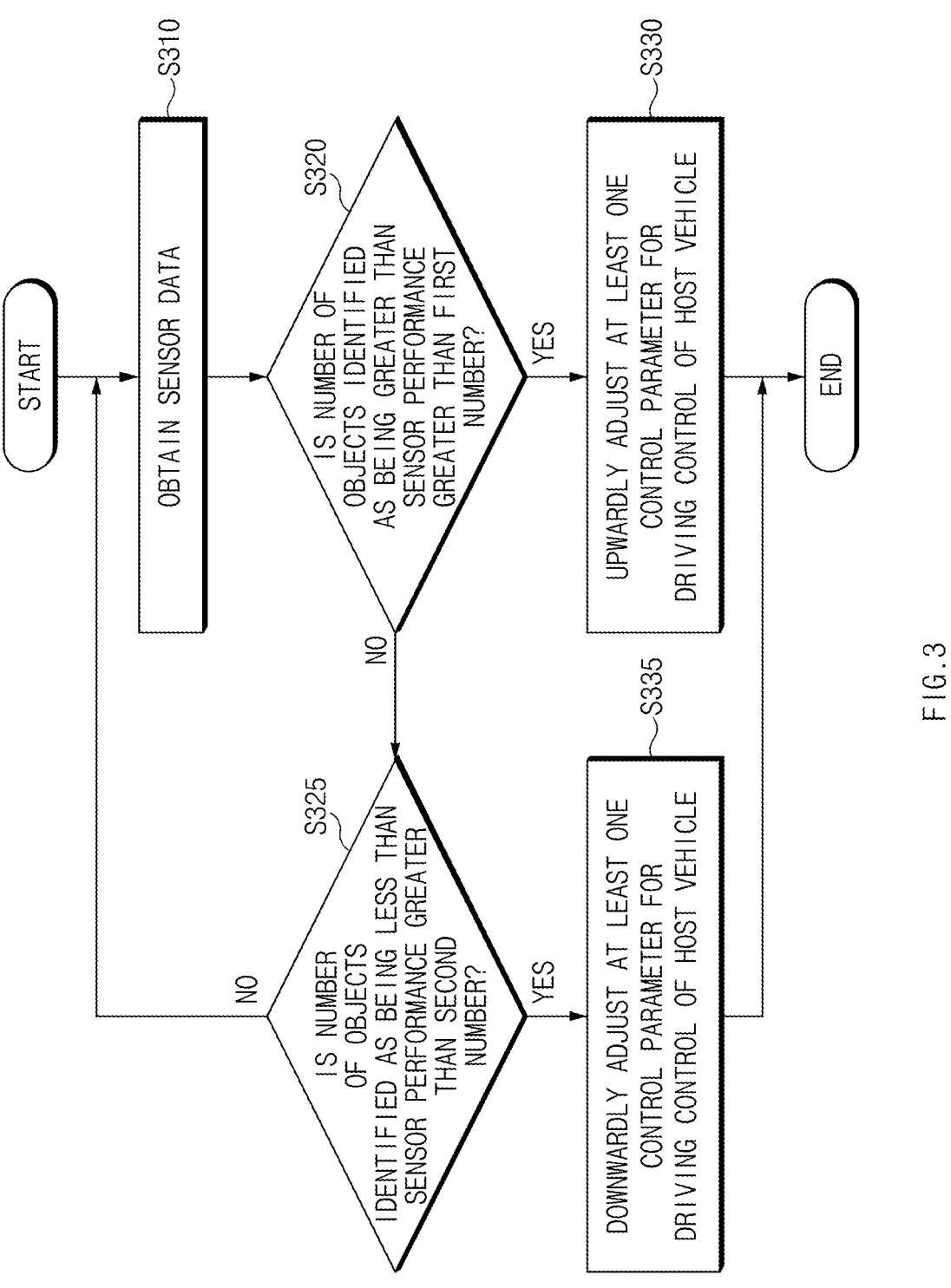

START

OBTAIN SENSOR DATA ～S310

IS NUMBER OF OBJECTS IDENTIFIED AS BEING GREATER THAN SENSOR PERFORMANCE GREATER THAN FIRST NUMBER? ～S320

YES

UPWARDLY ADJUST AT LEAST ONE CONTROL PARAMETER FOR DRIVING CONTROL OF HOST VEHICLE ～S330

NO

IS NUMBER OF OBJECTS IDENTIFIED AS BEING LESS THAN SENSOR PERFORMANCE GREATER THAN SECOND NUMBER? ～S325

YES

DOWNWARDLY ADJUST AT LEAST ONE CONTROL PARAMETER FOR DRIVING CONTROL OF HOST VEHICLE ～S335

NO

END

FIG.3

AUTONOMOUS DRIVING CONTROL APPARATUS AND METHOD THEREOF

CROSS-REFERENCE TO RELATED APPLICATIONS

This application claims the benefit of Korean Patent Application No. 10-2023-0148145, filed on Oct. 31, 2023, which application is hereby incorporated herein by reference.

TECHNICAL FIELD

The present disclosure relates to an autonomous driving control apparatus and a method thereof.

BACKGROUND

As autonomous vehicles have been gradually spread, various technologies about autonomous driving have been developed. The autonomous driving may be divided into partial autonomous driving, conditional autonomous driving, high autonomous driving, and/or full autonomous driving depending on its control level.

Meanwhile, various types of control algorithms (or functions) for changing at least some of parameters for control of a host vehicle in response to an identified event and performing stable and consistent autonomous driving control, when various events (e.g., deterioration in specific device) occur while performing driving control for the host vehicle, have been developed among autonomous driving control functions.

For example, when identifying that a portion of the performance of the host vehicle deteriorates or is improved, an autonomous driving control apparatus may perform a function of notifying a user of corresponding information in various methods.

However, the method for providing the user with information in the autonomous driving control apparatus may increase the convenience of the user in terms of usability. However, actually, there is a need for a direct change in control algorithm such that the autonomous driving control apparatuses more appropriately control the host vehicle.

In addition, when performing autonomous driving control using the same control parameter as before when an abnormality in sensor occurs or when the host vehicle is driving in a bad condition (e.g., a section with a high gradient, an icy section, an accident occurrence caution section, or the like), there is a high probability that a critical situation will occur (e.g., stopped vehicle response failure).

Furthermore, when controlling the host vehicle using a fixed control parameter without regard to a vehicle type or real-time performance of a vehicle, a different behavior is shown for each vehicle.

SUMMARY

The present disclosure relates to an autonomous driving control apparatus and a method thereof, and more particularly, relates to technologies of changing a control parameter on the basis of a performance state of a host vehicle.

Embodiments of the present disclosure have been made to solve the above-mentioned problems occurring in the prior art while advantages achieved by the prior art can be maintained intact.

An embodiment of the present disclosure provides an autonomous driving control apparatus for identifying a performance deterioration degree or a performance improvement degree of a sensor device using information obtained by the sensor device and adjusting at least one control parameter for driving control (e.g., stopped vehicle response control) of a host vehicle based on the identified degree.

An embodiment of the present disclosure provides an autonomous driving control apparatus for identifying a performance deterioration degree or a performance improvement degree of driving performance based on driving performance verification information including internal information of a host vehicle, external information of the host vehicle, geographic information of the host vehicle, driving information of the host vehicle, or any combination thereof, and adjusting at least one control parameter for driving control (e.g., stopped vehicle response control) of the host vehicle based on the identified degree.

The technical problems to be solved by an embodiment of the present disclosure are not necessarily limited to the aforementioned problems, and any other technical problems not mentioned herein can be clearly understood from the following description by those skilled in the art to which the present disclosure pertains.

According to an embodiment of the present disclosure, an autonomous driving control apparatus may include a sensor device, a memory storing at least one instruction, and a controller operatively connected with the sensor device and the memory. For example, the at least one instruction may be configured to, when executed by the controller, cause the autonomous driving control apparatus to obtain sensor performance verification information based on identification information of at least one object identified using the sensor device, obtain driving performance verification information including internal information of a host vehicle, external information of the host vehicle, geographic information of the host vehicle, driving information of the host vehicle, or any combination thereof, and adjust at least one control parameter for driving control of the host vehicle based on at least one of the sensor performance verification information or the driving performance verification information, or any combination thereof.

According to an embodiment, the at least one instruction may be configured to, when executed by the controller, cause the autonomous driving control apparatus to identify whether the number of first objects identified as being greater than performance of the sensor device is greater than a first number, based on the identification information of the at least one object, obtain the sensor performance verification information including information that the performance of the sensor device is improved, when it is identified that the number of the first objects is greater than the first number, and change the at least one control parameter based on the sensor performance verification information.

According to an embodiment, the at least one instruction may be configured to, when executed by the controller, cause the autonomous driving control apparatus to raise a minimum speed for starting stopped object response control among the at least one control parameter, based on the sensor performance verification information.

According to an embodiment, the at least one instruction may be configured to, when executed by the controller, cause the autonomous driving control apparatus to change the at least one control parameter in proportion to a performance improvement degree of the sensor device, the performance improvement degree being identified based on the sensor performance verification information.

According to an embodiment, the at least one instruction may be configured to, when executed by the controller, cause the autonomous driving control apparatus to identify whether the number of second objects identified as being less than performance of the sensor device is greater than a second number, based on the identification information of the at least one object, obtain the sensor performance verification information including information that the performance of the sensor device deteriorates, when it is identified that the number of the second objects is greater than the second number, and change the at least one control parameter based on the sensor performance verification information.

According to an embodiment, the at least one instruction may be configured to, when executed by the controller, cause the autonomous driving control apparatus to lower a minimum speed for starting stopped object response control among the at least one control parameter, based on the sensor performance verification information.

According to an embodiment, the at least one instruction may be configured to, when executed by the controller, cause the autonomous driving control apparatus to identify whether the number of first objects identified as being greater than performance of the sensor device is greater than a first number and whether the number of second objects identified as being less than the performance of the sensor device is greater than a second number, based on the identification information of the at least one object, and maintain the at least one control parameter, when the number of the first objects is less than or equal to the first number and when the number of the second objects is less than or equal to the second number.

According to an embodiment, the at least one instruction may be configured to, when executed by the controller, cause the autonomous driving control apparatus to identify whether a rain sensor or a wiper is activated and whether a notification indicating an icy state of a road is turned on, based on the driving performance verification information, and determine driving performance of the host vehicle as a first deterioration state and change the at least one control parameter by a first value, when the rain sensor or the wiper is activated and the notification is turned off, or when the rain sensor and the wiper are deactivated and the notification is turned on.

According to an embodiment, the at least one instruction may be configured to, when executed by the controller, cause the autonomous driving control apparatus to determine the driving performance of the host vehicle as a second deterioration state and change the at least one control parameter by a second value greater than the first value, when the rain sensor or the wiper is activated and the notification is turned on.

According to an embodiment, the at least one instruction may be configured to, when executed by the controller, cause the autonomous driving control apparatus to identify whether the host vehicle is driving in an accident occurrence caution section or is scheduled to drive in the accident occurrence caution section, using the driving performance verification information, and change the at least one control parameter during a driving section including the accident occurrence caution section and a specified margin distance, when it is identified that the host vehicle is driving in the accident occurrence caution section or is scheduled to drive in the accident occurrence caution section in the state in which the notification is turned on or the rain sensor or the wiper is activated.

According to an embodiment, the at least one instruction may be configured to, when executed by the controller, cause the autonomous driving control apparatus to identify required acceleration for control of the host vehicle and real-time acceleration of the host vehicle based on the driving performance verification information and raise a minimum speed for starting stopped object response control among the at least one control parameter, when an error between the required acceleration and the real-time acceleration and a convergence value of the real-time acceleration meet a specified condition.

According to an embodiment, the at least one instruction may be configured to, when executed by the controller, cause the autonomous driving control apparatus to identify required acceleration for control of the host vehicle and real-time acceleration of the host vehicle based on the driving performance verification information and lower a minimum speed for starting stopped object response control among the at least one control parameter, when an error between the required acceleration and the real-time acceleration and a convergence value of the real-time acceleration do not meet a specified condition.

According to an embodiment, the at least one instruction may be configured to, when executed by the controller, cause the autonomous driving control apparatus to gradually restore at least one control parameter to an initial parameter value, when identifying that sensor performance and the driving performance of the host vehicle are restored to correspond to initial performance, after adjusting the at least one control parameter for the driving control of the host vehicle.

According to an embodiment, the identification information may include information about a recognition distance at which each of the at least one object is recognized. The sensor performance verification information may include information about recognition performance of the sensor device. The driving performance verification information may include the internal information including information about whether a rain sensor or a wiper is activated, the external information including information about a notification indicating an icy state of a road operates, the geographic information including navigation information, and the driving information including required acceleration for driving control of the host vehicle and real-time acceleration of the host vehicle.

According to an embodiment, the autonomous driving control apparatus may further include a notification device. For example, the at least one instruction may be configured to, when executed by the controller, cause the autonomous driving control apparatus to provide information about a performance state of the sensor device, the performance state being identified based on the sensor performance verification information, a driving state of the host vehicle, the driving state being identified based on the driving performance verification information, a change in the at least one control parameter, or any combination thereof, using the notification device.

According to an embodiment of the present disclosure, an autonomous driving control method may include obtaining, by the controller, sensor performance verification information based on identification information of at least one object identified using a sensor device, obtaining, by the controller, driving performance verification information including internal information of a host vehicle, external information of the host vehicle, geographic information of the host vehicle, driving information of the host vehicle, or any combination thereof, and adjusting, by the controller, at least one control parameter for driving control of the host vehicle based on at least one of the sensor performance verification information or the driving performance verification information, or any combination thereof.

According to an embodiment, the autonomous driving control method may further include identifying, by the controller, whether the number of first objects identified as being greater than performance of the sensor device is greater than a first number, based on the identification information of the at least one object, obtaining, by the controller, the sensor performance verification information including information that the performance of the sensor device is improved, when it is identified that the number of the first objects is greater than the first number, and changing, by the controller, the at least one control parameter based on the sensor performance verification information.

According to an embodiment, the changing of the at least one control parameter based on the sensor performance verification information by the controller may include raising, by the controller, a minimum speed for starting stopped object response control among the at least one control parameter, based on the sensor performance verification information.

According to an embodiment, the autonomous driving control method may further include identifying, by the controller, whether a rain sensor or a wiper is activated and whether a notification indicating an icy state of a road is turned on, based on the driving performance verification information, and determining, by the controller, driving performance of the host vehicle as a first deterioration state and changing, by the controller, the at least one control parameter by a first value, when the rain sensor or the wiper is activated and the notification is turned off, or when the rain sensor and the wiper are deactivated and the notification is turned on.

According to an embodiment, the autonomous driving control method may further include determining, by the controller, the driving performance of the host vehicle as a second deterioration state and changing, by the controller, the at least one control parameter by a second value greater than the first value, when the rain sensor or the wiper is activated and the notification is turned on.

BRIEF DESCRIPTION OF THE DRAWINGS

The above and other features and advantages of the present disclosure can be more apparent from the following detailed description taken in conjunction with the accompanying drawings, in which:

FIG. 3 is a flowchart of an autonomous driving control method according to an embodiment of the present disclosure;

Figure 1:
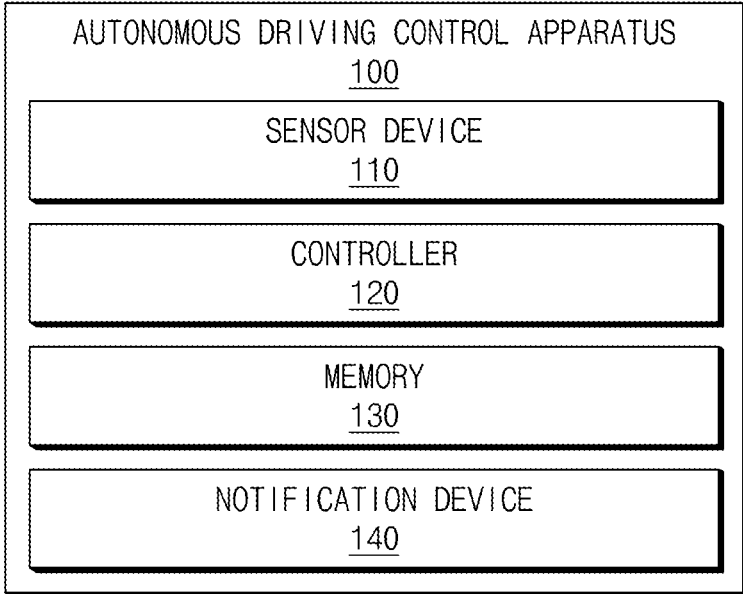
FIG. 1 is a block diagram illustrating components of an autonomous driving control apparatus according to an embodiment of the present disclosure.

With regard to description of drawings, same or similar denotations may be used for same or similar components.

DETAILED DESCRIPTION OF ILLUSTRATIVE EMBODIMENTS

Hereinafter, some embodiments of the present disclosure will be described in detail with reference to the example drawings. In adding the reference numerals to the components of each drawing, it can be noted that the identical component can be designated by the identical numerals even when they are displayed on other drawings. In addition, a detailed description of well-known features or functions can be omitted to not unnecessarily obscure the gist of the present disclosure.

In describing the components of an embodiment according to the present disclosure, terms such as first, second, "A", "B", "(a)", "(b)", and the like may be used. These terms can be used merely to distinguish one element from another element, but do not necessarily limit the corresponding elements irrespective of the order or priority of the corresponding elements. Furthermore, unless otherwise defined, all terms including technical and scientific terms used herein can have the same meaning as being generally understood by those skilled in the art to which the present disclosure pertains. Such terms as those defined in a generally used dictionary can be interpreted as having meanings equal to the contextual meanings in the relevant field of art.

Hereinafter, embodiments of the present disclosure will be described in detail with reference to FIGS. 1 to 7.

FIG. 1 is a block diagram illustrating components of an autonomous driving control apparatus according to an embodiment of the present disclosure.

According to an embodiment, an autonomous driving control apparatus 100 may include a sensor device 110, a controller 120, a memory 130, a notification device 140, or any combination thereof. The components of the autonomous driving control apparatus 100, which are shown in FIG. 1, are illustrative, and embodiments of the present disclosure are not necessarily limited thereto. For example, the autonomous driving control apparatus 100 may further include components (e.g., an interface, a communication device, a display, or any combination thereof) which are not shown in FIG. 1.

According to an embodiment, the sensor device 110 may obtain (or identify) various pieces of information used for driving of a host vehicle.

For example, the sensor device 110 may include at least one sensor including a camera, radio detection and ranging (RADAR), light detection and ranging (LiDAR), or any combination thereof. The sensor device 110, even though referred to in singular, may include multiple sensors.

For example, the sensor 110 may operate based on a sensor parameter. As an example, the sensor parameter may be an example of a setting value about operation performance of the sensor device 110, which may be stored in the memory 130. As an example, the sensor parameter may be a setting value capable of being changed by a user and/or a developer.

For example, the sensor 110 may operate based on initially set recognition performance. As an example, the recognition performance may include performance information when the sensor device 110 recognizes an object (e.g., performance information about a recognizable distance, a recognizable range, or any combination thereof).

For example, the autonomous driving control apparatus 100 may identify that recognition performance of the sensor device 110 is improved, based on the information obtained by the sensor device 110. As an example, when information meeting a specified first condition (e.g., identified as being greater than an initially set recognition distance) among pieces of information obtained by the sensor device 110 is greater than a specified amount, the controller 120 may determine that the recognition performance of the sensor device 110 is improved.

For example, the autonomous driving control apparatus 100 may identify that the recognition performance of the sensor device 110 deteriorates, based on the information obtained by the sensor device 110. As an example, when information meeting a specified second condition (e.g., a condition which does not meet initially set recognition performance) among the pieces of information obtained by the sensor device 110 is greater than the specified amount, the controller 120 may determine that the recognition performance of the sensor device 110 deteriorates.

According to an embodiment, the controller 120 may be operatively connected with the sensor 110, the memory 130, the notification device 140, or any combination thereof. For example, the controller 120 may control operations of the sensor device 110, the memory 130, the notification device 140, or any combination thereof.

According to an embodiment, the controller 120 may obtain information about performance of the apparatus 100 using at least some of pieces of information identified using the sensor device 110.

For example, the controller 120 may obtain sensor performance verification information based on identification information of each of at least one object (e.g., at least one of a person, another vehicle, a thing, a building, or any combination thereof) identified using the sensor device 110.

As an example, the identification information may include information about a recognition distance at which each of the at least one object is recognized. In other words, the identification information corresponding to the specific object may include information about a distance at which the specific object is recognized (or a separation distance between the specific object and the host vehicle).

As an example, the sensor performance verification information may include information about recognition performance of the sensor device 110. In other words, the sensor performance verification information may include at least one of a distance at which objects recognized by the sensor device 110 are recognized, a range in which the objects recognized by the sensor device 110 are recognized, accuracy in which the objects recognized by the sensor device 110 are recognized, or any combination thereof.

For example, the controller 120 may obtain driving performance verification information including internal information of the host vehicle, external information of the host vehicle, geographic information of the host vehicle, driving information of the host vehicle, or any combination thereof.

As an example, the driving performance verification information may include the internal information including information about whether a rain sensor and/or a wiper is activated.

As an example, the driving performance verification information may include the external information including information about whether a notification indicating an icy state of a road operates.

As an example, the driving performance verification information may include geographic information indicating navigation information.

As an example, the driving performance verification information may include the driving information including required acceleration for driving control of the host vehicle and real-time acceleration of the host vehicle.

For example, the controller 120 may adjust at least one control parameter for driving control of the host vehicle based on at least one of the sensor performance verification information, the driving performance verification information, or any combination thereof. In other words, when a change in sensor performance and/or a change in driving performance are/is identified, the controller 120 may change at least one control parameter for driving control (e.g., stopped vehicle response control and/or the stopped object response control) of the host vehicle (e.g., a minimum speed for starting the stopped object response control) based on a degree of the change.

As an example, the stopped object response control may include a control algorithm for changing a driving scheme of the host vehicle in response to a stopped object, for example, decreasing a driving speed of the host vehicle or changing a driving direction of the host vehicle to ensure a safety distance between the host vehicle and the stopped object in the autonomous driving control apparatus 100, when there is the stopped object in an area near the host vehicle.

As an example, the controller 120 may identify whether the number of first objects identified as being greater than performance measured by the sensor device 110 is greater than a first number, based on the identification information of the at least one object. For example, the first objects may include at least one external object recognized in a range (a more improved performance range) in which they are greater than the performance measured by the sensor device 110, which is stored in the memory 130.

As an example, when it is identified that the number of the first objects is greater than the first number, the controller 120 may obtain the sensor performance verification information including information that the performance measured by the sensor device 110 is improved. In other words, when identifying that the number of the first objects is greater than the first number, the controller 120 may determine that the performance measured by the sensor device 110 is more improved than a threshold, set, or predetermined performance.

As an example, the controller 120 may change the at least one control parameter based on the sensor performance verification information. For example, the controller 120 may raise (or increase) the minimum speed for starting the stopped object response control among the at least one control parameter, based on the sensor performance verification information. For example, the controller 120 may change (e.g., raise) the at least one control parameter (e.g., the minimum speed for starting the stopped object response control) in proportion to a performance improvement degree measured by the sensor device 110, which can be identified based on the sensor performance verification information. The controller 120 may store the changed control parameter in the memory 130.

As an example, the controller 120 may identify whether the number of second objects identified as being less than the performance measured by the sensor device 110 is greater than a second number, based on the identification information of the at least one object. For example, the second objects may include at least one external object recognized in a range (a more degraded performance range) in which they are less than the performance measured by the sensor device 110, which is stored in the memory 130.

As an example, when it is identified that the number of the second objects is greater than the second number, the controller 120 may obtain the sensor performance verification information including information that the performance measured by the sensor device 110 deteriorates. In other words, when identifying that the number of the second objects is greater than the second number, the controller 120 may determine that the performance measured by the sensor device 110 more deteriorates than the predetermined performance.

As an example, the controller 120 may change the at least one control parameter based on the sensor performance verification information. For example, the controller 120 may lower (or decrease) the minimum speed for starting the stopped object response control among the at least one control parameter, based on the sensor performance verification information. For example, the controller 120 may change (e.g., lower) the at least one control parameter (e.g., the minimum speed for starting the stopped object response control) in proportion to a performance deterioration degree measured by the sensor device 110, which is identified based on the sensor performance verification information. The controller 120 may store the changed control parameter in the memory 130.

For example, the controller 120 may identify whether the number of the first objects identified as being greater than the performance measured by the sensor device 110 is greater than the first number and whether the number of the second objects identified as being less than the performance measured by the sensor device 110 is greater than the second number, based on the identification information of each of the at least object. When the number of the first objects is less than or equal to the first number and when the number of the second objects is less than or equal to the second number, the controller 120 may maintain the at least one control parameter without change.

For example, the controller 120 may determine whether to change the at least one control parameter based on the driving performance verification information.

As an example, the controller 120 may determine whether the rain sensor or a wiper is activated and whether a notification indicating an icy state of a road is turned on, based on the driving performance verification information. When the rain sensor or the wiper is activated and the notification is turned off, the controller 120 may determine driving performance of the host vehicle as a first deterioration state and may change the at least one control parameter by a first value. Furthermore, even when the rain sensor and the wiper are deactivated and the notification is turned on, the controller 120 may determine the driving performance of the host vehicle as the first deterioration state and may change the at least one control parameter by the first value. The first deterioration state may be defined as a deterioration preparation state to prepare for deterioration in the driving performance of the host vehicle.

As an example, when the rain sensor or the wiper is activated and the notification is turned on, the controller 120 may determine the driving performance of the host vehicle as a second deterioration state and may change the at least one control parameter by a second value greater than the first value. In other words, when the notification indicating the icy state is turned on in the state in which the rain sensor or the wiper is activated, the controller 120 may expect that the driving performance will more deteriorate than the first deterioration state and may change the at least one control parameter using the second value greater than the first value.

For example, the controller 120 may identify section information of a road on which the host vehicle is driving using the driving performance verification information and may change the at least one control parameter based further on the section information. For example, the controller 120 may identify whether the host vehicle is driving in an accident occurrence caution section or is scheduled to drive in the accident occurrence caution section, using the driving performance verification information.

When it is identified that the host vehicle is driving in the accident occurrence caution section or is scheduled to drive in the accident occurrence caution section, and in the situation in which the notification is turned on, the controller 120 may change the at least one control parameter during a driving section including the accident occurrence caution section and a specified margin distance.

When it is identified that the host vehicle is driving in the accident occurrence caution section or is scheduled to drive in the accident occurrence caution section, and in the situation in which the rain sensor or the wiper is activated, the controller 120 may change the at least one control parameter during the driving section including the accident occurrence caution section and the specified margin distance.

In other words, in the above two situations, the controller 120 may temporarily change the at least one control parameter while controlling the host vehicle from the accident occurrence caution section and a section end point from the specified margin distance. The controller 120 may determine the above situation as a driving performance deterioration state and may change the at least one control parameter based on a value greater than a value corresponding to the first deterioration state and the second deterioration state.

For example, the controller 120 may identify required acceleration for control of the host vehicle and real-time acceleration of the host vehicle based on the driving performance verification information and may determine whether to change the at least one control parameter based on the result of comparing the required acceleration with the real-time acceleration.

As an example, when an error between the required acceleration and the real-time acceleration and a convergence value of the real-time acceleration meet a specified condition, the controller 120 may raise the minimum speed for starting the stopped object response control among the at least one control parameter. In other words, when the real-time acceleration of the host vehicle follows at a specified error or less and simultaneously when latency for following is less than a specified time, the controller 120 may determine that the error between the required acceleration and the real-time acceleration and the convergence value of the real-time acceleration meet the specified condition and may raise the minimum speed for starting the stopped object response control.

As an example, when the error between the required acceleration and the real-time acceleration and the convergence value of the real-time acceleration do not meet the specified condition, the controller 120 may lower the minimum speed for starting the stopped object response control among the at least one control parameter. In other words, when the error between the real-time acceleration and the required acceleration of the host vehicle is greater than the specified error and when the latency for following is greater than or equal to the specified time, the controller 120 may determine that the error between the required acceleration and the real-time acceleration and the convergence value of the real-time acceleration do not meet the specified condition and may lower the minimum speed for starting the stopped object response control.

For example, after adjusting the at least one control parameter for driving control of the host vehicle, when identifying that the sensor performance and the driving performance of the host vehicle are restored to correspond to initial performance, the controller 120 may gradually restore the adjusted at least one control parameter to an initial parameter value. As an example, in the situation in which the minimum speed for starting the stopped object response control is changed, when identifying that the performance measured by the sensor device 110 or the driving performance of the host vehicle is restored to a degraded or unimproved state, the controller 120 may gradually restore the above-mentioned minimum speed to the initial parameter as time passes.

For example, the controller 120 may provide the user with pieces of information about the control parameter or the performance of the host vehicle using various pieces of content using the notification device 140.

As an example, the controller 120 may provide information about at least one of a performance state measured by the sensor device 110, which can be identified based on the sensor performance verification information, a driving state of the host vehicle, which can be identified based on the driving performance verification information, a change in the at least one control parameter, or any combination thereof.

According to an embodiment, the memory 130 may store a command or data. For example, the memory 130 may store one or more instructions, when executed by the controller 120, causing the autonomous driving control apparatus 100 to perform various operations.

For example, the memory 130 and the controller 120 may be implemented as one chipset. The controller 120 may include at least one of a communication processor or a modem.

For example, the memory 130 may store various pieces of information associated with the autonomous driving control apparatus 100. As an example, the memory 130 may store information about an operation history of the controller 120. As an example, the memory 130 may store information associated with states and/or operations of components (e.g., at least one of an engine control unit (ECU), the sensor device 110, the controller 120, the notification unit 140, or any combination thereof) of the host vehicle.

For example, the memory 130 may store an initial parameter about the performance of the sensor device 110. The initial parameter may include, for example, a parameter value about operation performance of the sensor device 110. As an example, the initial parameter may include information that a guaranteed sensing distance of the RADAR corresponds to a specified distance (e.g., 100 m).

According to an embodiment, the notification device 140 may provide the user with pieces of information about an operation of the autonomous driving control apparatus 100. For example, the notification device 140 may provide the user with information about at least some of the above-mentioned operations of the controller 120.

For example, the notification device 140 may include at least one display device (e.g., a display).

For example, the notification device 140 may include at least one sound output device (e.g., a speaker).

For example, the notification device 140 may include at least one haptic device. The haptic device may be provided in at least one area of a seat to provide the user with vibration.

For example, the notification device 140 may provide information about at least one of a performance state measured by the sensor device 110, which is identified based on the sensor performance verification information, a driving state of the host vehicle, which is identified based on the driving performance verification information, a change in the at least one control parameter, or any combination thereof, under control of the controller 120.

Figure 2:
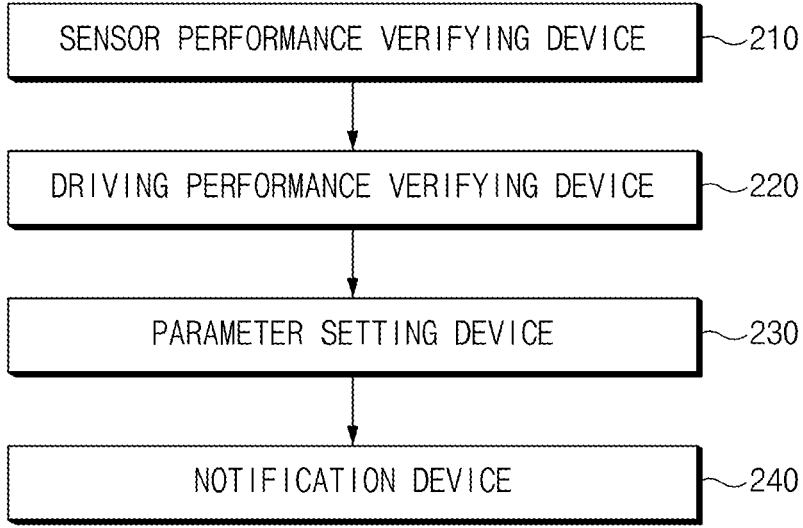
FIG. 2 is a block diagram illustrating components of an autonomous driving control apparatus according to an embodiment of the present disclosure.

FIG. 2 is a block diagram illustrating components of an autonomous driving control apparatus according to an embodiment of the present disclosure.

According to an embodiment, an autonomous driving control apparatus (e.g., an autonomous driving control apparatus 100 of FIG. 1) may include a sensor performance verifying device 210, a driving performance verifying device 220, a parameter setting device 230, a notification device 240 (e.g., a notification device 140 of FIG. 1), or any combination thereof.

The structure of the components shown in FIG. 2 is illustrative, and embodiments of the present disclosure are not necessarily limited thereto. For example, at least some (e.g., the sensor performance verifying device 210, the driving performance verifying device 220, and/or the parameter setting device 230) of the components shown in FIG. 2 may be implemented as a part of a sensor device 110 and/or a controller 120 of FIG. 1 or may be implemented together with the sensor device 110 and/or the controller 120 as one chip. In other words, at least some of operations of at least some of components that will be described below may be performed by the sensor device 110 and/or the controller 120 of FIG. 1 (or control of the controller 120).

For example, the sensor performance verifying device 210 may monitor a state of a sensor device.

As an example, the sensor performance verifying device 210 may identify whether the performance measured by the sensor device is improved or deteriorates, based on data obtained by the sensor device 110.

As an example, the sensor performance verifying device 210 may identify a control parameter (e.g., an initial control parameter) set in conjunction with an operation of the sensor device 110. The sensor performance verifying device 210 may identify a change in performance measured by the sensor device 110, based on the data obtained using the sensor device and the control parameter identified using the sensor device.

As an example, the sensor performance verifying device 210 may identify sensor performance verification information based on identification information of at least one object identified using the sensor device. The sensor performance verifying device 210 may identify, for example, a position at which the at least one object is identified and a distance (or a recognition distance) between the at least one object and the host vehicle based on identification information of each of the at least one object.

As an example, the sensor performance verifying device 210 may identify whether the performance measured by the sensor device is currently more improved or deteriorates than threshold/set/predetermined performance of the sensor device, based on the sensor performance verification information.

For example, the driving performance verifying device 220 may monitor a state about driving of the host vehicle.

As an example, the driving performance verifying device 220 may obtain driving performance verification information including at least one of internal information of the host vehicle, external information of the host vehicle, geographic information of the host vehicle, driving information of the host vehicle, or any combination thereof. The driving performance verifying device 220 may identify whether a driving environment deteriorates, based on the driving performance verification information.

As an example, the driving performance verifying device 220 may obtain the internal information including information about whether a rain sensor or a wiper is activated, the external information including information about whether a notification indicating an icy state of a road operates, the geographic information indicating navigation information, and the driving information including required acceleration for driving control of the host vehicle and real-time acceleration of the host vehicle.

As an example, the driving performance verifying device 220 may identify a degree to which autonomous driving control performance deteriorates or is improved, based on whether an error between the required acceleration and the real-time acceleration meets a specified condition.

For example, the parameter setting device 230 may change at least one control parameter for driving control of the host vehicle, based on information about performance of the host vehicle, which can be output from the sensor performance verifying device 210 and the driving performance verifying device 220.

As an example, the parameter setting device 230 may change at least one control parameter for driving control (e.g., stopped object response control) of the host vehicle (e.g., a minimum speed for starting the stopped object response control) in proportion to a degree of a change in performance measured by the sensor device and/or driving performance, which can be determined by the sensor performance verifying device 210 and/or the driving performance verifying device 220.

As an example, when it is determined that the performance measured by the sensor device and/or the driving performance are/is raised or changed and are/is restored to an initial value again, the parameter setting device 230 may gradually restore the changed at least one control parameter to the initial value.

For example, the notification device 240 may provide a user with information about at least one of a performance state of the sensor device, which is identified based on the sensor performance verification information, a driving state of the host vehicle, which is identified based on the driving performance verification information, a change in the at least one control parameter, or any combination thereof.

FIG. 3 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 3. For example, at least some of components (e.g., a sensor device 110, a controller 120, a memory 130, a notification device 140, or any combination thereof, of FIG. 1) included in the autonomous driving control apparatus may be configured to perform the operations of FIG. 3.

Operations S310 to S335 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 3, may be briefly described or omitted.

According to an embodiment, at operation S310, the autonomous driving control apparatus may obtain sensor data.

For example, the autonomous driving control apparatus may obtain at least one piece of sensor data necessary to perform autonomous driving control for a host vehicle using a sensor device.

For example, the autonomous driving control apparatus may identify at least one object that is present outside the host vehicle using the sensor device.

For example, the autonomous driving control apparatus may obtain identification information of each of the at least one object. The identification information may include information about a recognition distance at which each of the at least one object is recognized.

For example, the autonomous driving control apparatus may obtain sensor performance verification information based on the identification information. The sensor performance verification information may include information about recognition performance measured by the sensor device.

According to an embodiment, at operation S320, the autonomous driving control apparatus may identify whether the number of objects identified as being greater than sensor performance is greater than a first number.

For example, the autonomous driving control apparatus may identify threshold/set/predetermined initial performance measured by the sensor device and may compare identification information about each of the at least one object of data obtained by the sensor device with the identified initial performance.

For example, the autonomous driving control apparatus may identify whether the number of objects identified as being greater than the sensor performance (or objects identified in a range in which they exceed recognition performance of the sensor device) among the at least one object is greater than the first number.

For example, when the number of the objects identified as being greater than the sensor performance is greater than the first number (e.g., YES at operation S320), the autonomous driving control apparatus may perform operation S330.

For example, when the number of the objects identified as being greater than the sensor performance is not greater than the first number (e.g., NO at operation S320), the autonomous driving control apparatus may perform operation S325.

According to an embodiment, at operation S330, the autonomous driving control apparatus may upwardly adjust at least one control parameter for driving control of the host vehicle.

For example, the autonomous driving control apparatus may identify that the performance of the sensor device is more improved than the threshold/set/predetermined performance and may upwardly adjust a minimum speed for starting stopped object response control. As a result, when identifying a stopped object, the autonomous driving control apparatus may fail to perform the stopped object response control even at a relatively high speed, thus performing more efficient and adaptive stopped object response control.

According to an embodiment, at operation S325, the autonomous driving control apparatus may identify whether the number of objects identified as being less than the sensor performance is greater than a second number.

For example, the autonomous driving control apparatus may identify the threshold/set/predetermined initial performance measured by the sensor device and may compare identification information about each of at least one object of data obtained by the sensor device with the identified initial performance.

For example, the autonomous driving control apparatus may identify whether the number of objects identified as being less than the sensor performance (or objects not identified in a range in which they are within the recognition performance of the sensor device or objects identified in a range in which they are less than the recognition performance measured by the sensor device) among the at least one object is greater than the second number. For example, the first number and the second number may be different from each other.

For example, when the number of the objects identified as being less than the sensor performance is greater than the second number (e.g., YES at operation S325), the autonomous driving control apparatus may perform operation S335.

For example, when the number of the objects identified as being less than the sensor performance is not greater than the second number (e.g., NO at operation S325), the autonomous driving control apparatus may repeatedly perform operation S310.

According to an embodiment, at operation S335, the autonomous driving control apparatus may downwardly adjust the at least one control parameter for the driving control of the host vehicle.

For example, the autonomous driving control apparatus may identify that the performance measured by the sensor device more deteriorates than the threshold/set/predetermined performance and may downwardly adjust the minimum speed for starting the stopped object response control. As a result, when identifying a stopped object, the autonomous driving control apparatus may perform the stopped object response control even at a relatively low speed, thus performing safer and stricter stopped object response control.

Figure 4:
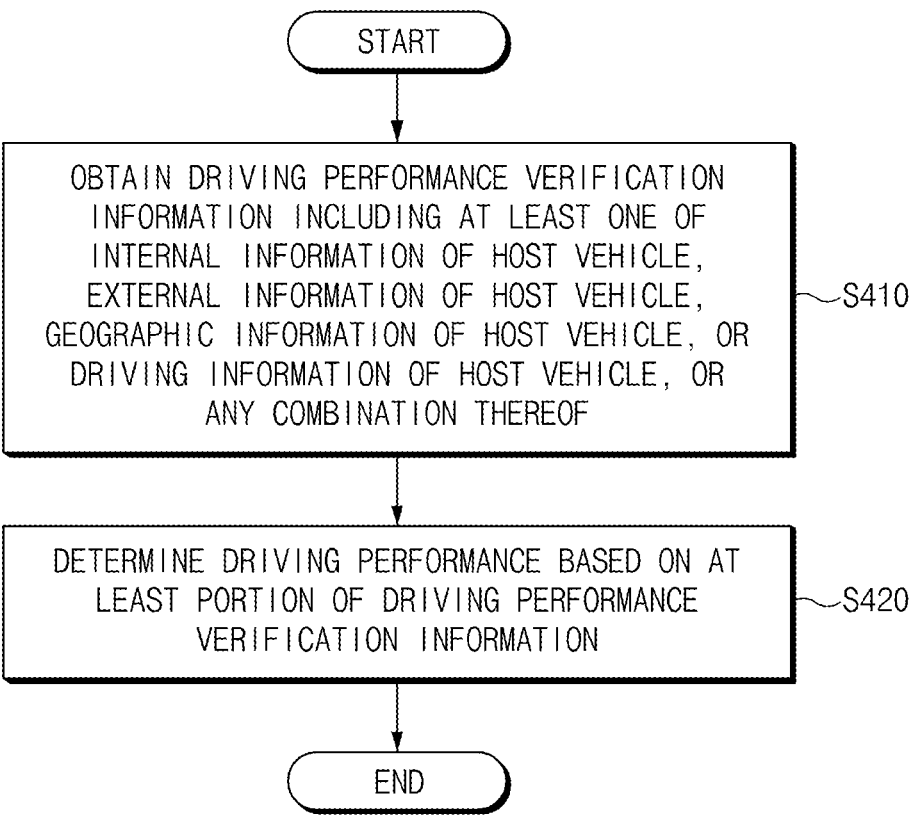
FIG. 4 is a flowchart of an autonomous driving control method according to an embodiment of the present disclosure.

FIG. 4 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 4. For example, at least some of components (e.g., a sensor device 110, a controller 120, a memory 130, a notification device 140, or combinations thereof, of FIG. 1) included in the autonomous driving control apparatus may be configured to perform the operations of FIG. 4.

Operations S410 to S420 in an embodiment below may be sequentially performed, but are not necessarily sequentially performed. For example, an order of the respective operations may be changed, and the operations may be performed in parallel. Furthermore, contents, which correspond to or are duplicated with the contents described above in conjunction with FIG. 4, may be briefly described or omitted.

According to an embodiment, at operation S410, the autonomous driving control apparatus may obtain driving performance verification information including at least one of internal information of a host vehicle, external information of the host vehicle, geographic information of the host vehicle, driving information of the host vehicle, or any combination thereof.

For example, the autonomous driving control apparatus may continuously monitor a change in performance state (e.g., driving performance state) about driving control of the host vehicle.

For example, the driving performance verification information may include the internal information including information about whether a rain sensor or a wiper is activated, the external information including information about whether a notification indicating an icy state of a road operates, the geographic information indicating navigation information, and driving information including required acceleration for driving control of the host vehicle and real-time acceleration of the host vehicle.

According to an embodiment, at operation S420, the autonomous driving control apparatus may determine driving performance based on at least a portion of the driving performance verification information.

For example, the autonomous driving control apparatus may identify whether the rain sensor or the wiper is activated and whether the notification indicating the icy state of the road is turned on, based on the driving performance verification information.

When the rain sensor or the wiper is activated and the notification is turned off, the autonomous driving control apparatus may determine driving performance of the host vehicle as a first deterioration state and may change at least one control parameter by a first value.

As an example, when the rain sensor and the wiper are deactivated and the notification is turned on, the autonomous driving control apparatus may determine the driving performance of the host vehicle as the first deterioration state and may change the at least one control parameter by the first value.

As an example, when the rain sensor or the wiper is activated and the notification is turned on, the autonomous driving control apparatus may determine the driving performance of the host vehicle as a second deterioration state and may change the at least one control parameter by a second value greater than the first value. In other words, in this case, the autonomous driving control apparatus may identify the driving performance of the host vehicle as the second deterioration state which more deteriorates than the first deterioration state.

As an example, when an error between required acceleration and real-time acceleration and a convergence value of the real-time acceleration meet a specified condition, the autonomous driving control apparatus may raise a minimum speed for starting stopped object response control among the at least one control parameter. In other words, in this case, the autonomous driving control apparatus may identify that the driving performance is improved and may more release a condition for starting the stopped object response control.

As an example, when the error between the required acceleration and the real-time acceleration and the convergence value of the real-time acceleration do not meet the specified condition, the autonomous driving control apparatus may lower the minimum speed for starting the stopped object response control among the at least one control parameter. In other words, in this case, the autonomous driving control apparatus may identify that the driving performance deteriorates and may more restrict the condition for the stopped object response control.

Figure 5:
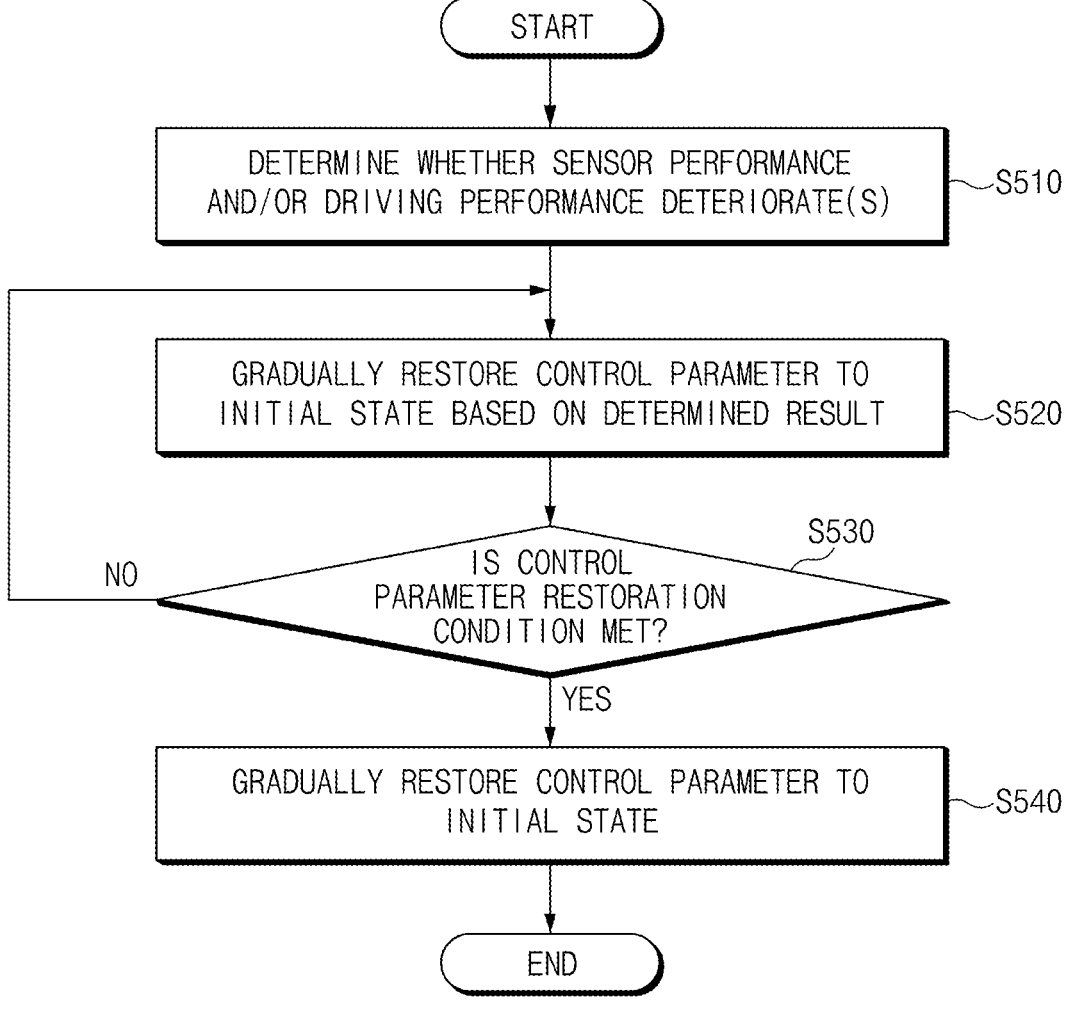
FIG. 5 is a flowchart of an autonomous driving control method according to an embodiment of the present disclosure.

FIG. 5 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 5. For example, at least some of components (e.g., a sensor device 110, a controller 120, a memory 130, a notification device 140, or any combination thereof, of FIG. 1) included in the autonomous driving control apparatus may be configured to perform the operations of FIG. 5.

Operations S510 to S540 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 5, may be briefly described or omitted.

According to an embodiment, at operation S510, the autonomous driving control apparatus may determine whether sensor performance and/or driving performance deteriorates.

For example, the autonomous driving control apparatus may monitor a change in sensor performance and/or driving performance using at least a portion of data obtained using a sensor device or data used for driving of a host vehicle and may determine whether the sensor performance and/or the driving performance deteriorate(s) based on the monitored result.

According to an embodiment, at operation S520, the autonomous driving control apparatus may change a control parameter for driving control of the host vehicle based on the determined result. One example of such a change may be gradually restoring a control parameter to an initial state based on a determined result, as illustrated at operation 520.

For example, when identifying that the sensor performance and/or the driving performance of the host vehicle deteriorate(s) or are/is improved, the autonomous driving control apparatus may lower (or decrease) or raise (or increase) a control parameter for driving control (e.g., stopped object response control) of the host vehicle (e.g., a minimum speed for starting the stopped object response control) in proportion to a deterioration degree and/or an improvement degree.

According to an embodiment, at operation S530, the autonomous driving control apparatus may identify whether a control parameter restoration condition is met.

For example, when identifying that the sensor performance and/or the driving performance are/is restored to an initially set performance state, the autonomous driving control apparatus may identify that a specified condition for restoring the changed control parameter to an initial setting value is met.

For example, when the control parameter restoration condition is met (e.g., YES at operation S530), the autonomous driving control apparatus may perform operation S540.

For example, when the control parameter restoration condition is not met (e.g., NO at operation S530), the autonomous driving control apparatus may repeatedly perform operation S520.

According to an embodiment, at operation S540, the autonomous driving control apparatus may gradually restore the control parameter to an initial state.

For example, the autonomous driving control apparatus may gradually restore the at least one control parameter changed at operation S520 to an initial parameter setting value as time passes.

Figure 6:
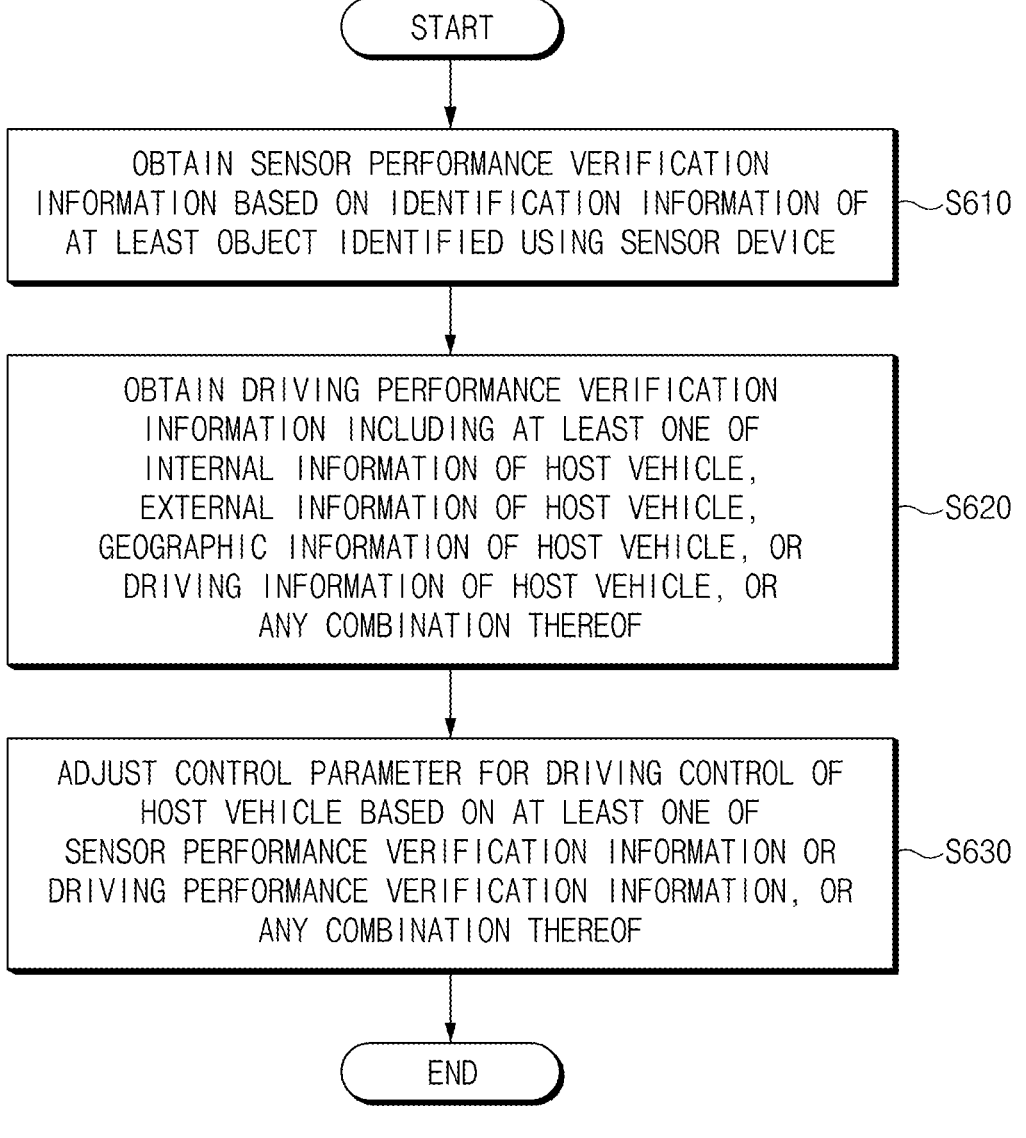
FIG. 6 is a flowchart of an autonomous driving control method according to an embodiment of the present disclosure.

FIG. 6 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 6. For example, at least some of components (e.g., a sensor device 110, a controller 120, a memory 130, a notification device 140, or any combination thereof, of FIG. 1) included in the autonomous driving control apparatus may be configured to perform the operations of FIG. 6.

Operations S610 to S630 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 6, may be briefly described or omitted.

According to an embodiment, at operation S610, the autonomous driving control apparatus may obtain sensor performance verification information based on identification information of at least object identified using a sensor device.

According to an embodiment, at operation S620, the autonomous driving control apparatus may obtain driving performance verification information including at least one of internal information of a host vehicle, external information of the host vehicle, geographic information of the host vehicle, or driving information of the host vehicle, or any combination thereof.

According to an embodiment, at operation S630, the autonomous driving control apparatus may adjust a control parameter for driving control of the host vehicle based on at least one of the sensor performance verification information or the driving performance verification information, or any combination thereof.

Figure 7:
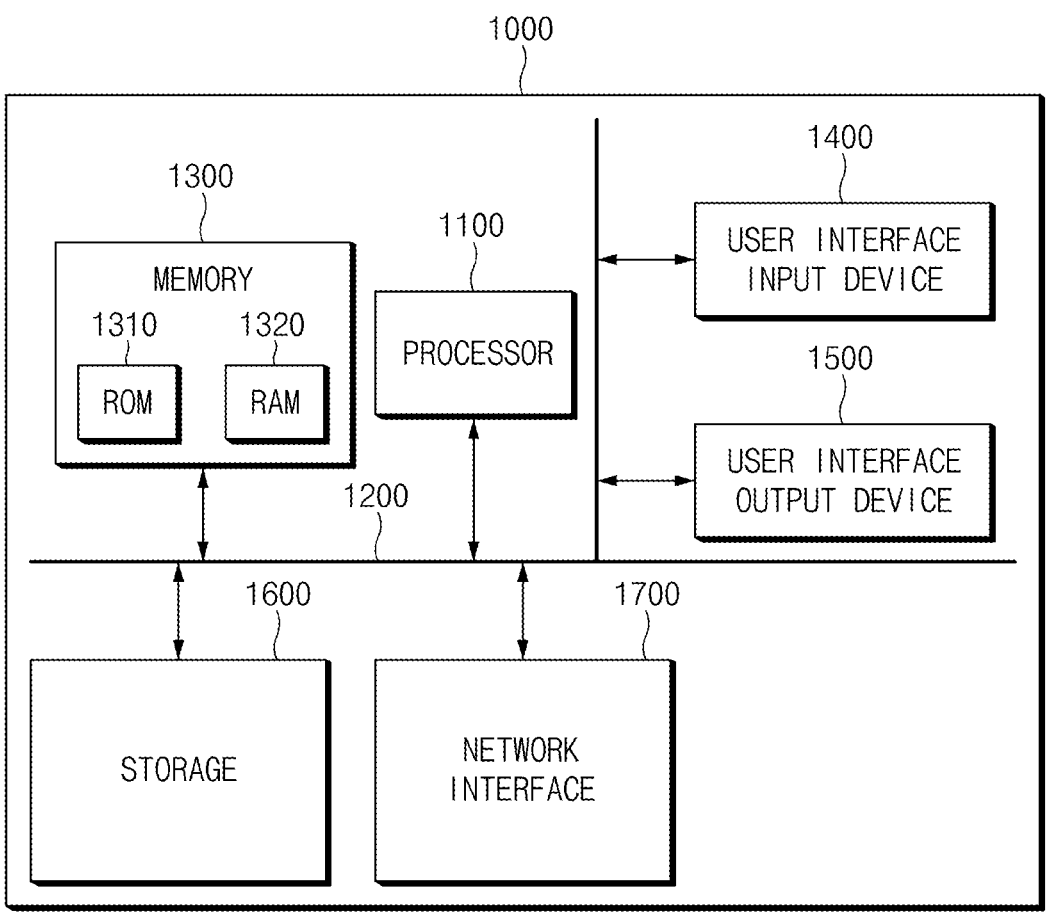
FIG. 7 illustrates a computing system of an autonomous driving control apparatus or an autonomous driving control method according to an embodiment of the present disclosure.

FIG. 7 illustrates a computing system that may be implemented for an autonomous driving control method according to an embodiment of the present disclosure.

Referring to FIG. 7, a computing system 1000 used for the autonomous driving control method may include at least one processor 1100, a memory 1300, a user interface input device 1400, a user interface output device 1500, storage 1600, and a network interface 1700, which are connected with each other via a bus 1200, and any of which may be in plural even though illustrated as singular.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an EPROM, an EEPROM, a register, a hard disc, a removable disk, a CD-ROM, or any combination thereof, for example.

The example storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of advantages of the autonomous driving control apparatus and the method thereof according to an embodiment of the present disclosure.

According to at least one of embodiments of the present disclosure, the autonomous driving control apparatus may identify a deterioration or improvement degree of autonomous driving control performance (e.g., sensor performance and/or driving performance) in real time and may adaptively adjust (or change) at least one control parameter for control (e.g., stopped vehicle response control) of the host vehicle based on the identified degree.

Furthermore, according to at least one of embodiments of the present disclosure, the autonomous driving control apparatus may quickly and appropriately change a control parameter, thus converging to target performance to perform an autonomous driving control function although the host vehicle is driving in any situation.

Furthermore, according to at least one of embodiments of the present disclosure, the autonomous driving control apparatus may provide the user with information about a change in control parameter or a change in sensor performance or driving performance, thus guiding the user to practice caution or arousing the user in an appropriate situation.

In addition, variations ascertained directly or indirectly through the present disclosure may be provided.

Hereinabove, although the present disclosure has been described with reference to example embodiments and the accompanying drawings, embodiments of the present disclosure are not necessarily limited thereto, but may be variously modified and altered by those skilled in the art to which the present disclosure pertains without departing from the spirit and scope of the present disclosure claimed in the following claims.

Therefore, embodiments of the present disclosure are not necessarily intended to limit the technical spirit of the present disclosure, but provide illustrations. The scope of the present disclosure can be construed on the basis of the accompanying claims, and all the technical ideas within scopes equivalent to the claims can be included in the scope of the present disclosure.

What is claimed is:

1. An autonomous driving control apparatus, comprising:
a sensor device;
a memory storing computer-executable code; and
a controller operatively connected with the sensor device and the memory, the controller being configured to execute the code, wherein the code comprises instructions for the controller to cause the autonomous driving control apparatus to:
obtain sensor performance verification information based on identification information of at least one object identified using the sensor device;
obtain driving performance verification information including one of or any combination of internal information of a host vehicle, external information of the host vehicle, geographic information of the host vehicle, and driving information of the host vehicle;
adjust at least one control parameter for driving control of the host vehicle based on one of or both of the sensor performance verification information and the driving performance verification information;

raise a minimum speed for starting stopped object response control among the at least one control parameter, based on the sensor performance verification information;
identify whether a number of first objects is greater than a first number and whether a number of second objects is greater than a second number, based on the identification information of the at least one object, wherein:
the first objects are identified as having a first performance measured by the sensor device greater than a first threshold performance, and
the second objects are identified as having a second performance measured by the sensor device less than a second threshold performance; and
maintain the at least one control parameter, in response to the number of the first objects being less than or equal to the first number and in response to the number of the second objects being less than or equal to the second number.

2. The autonomous driving control apparatus of claim 1, wherein the code further comprises instructions for the controller to cause the autonomous driving control apparatus to:
identify whether the number of the first objects is greater than the first number, based on the identification information of the at least one object, wherein the first objects are identified as having a performance measured by the sensor device greater than a threshold performance;
obtain the sensor performance verification information including information that the performance measured by the sensor device is improved, in response to identifying that the number of the first objects is greater than the first number; and
change the at least one control parameter based on the sensor performance verification information.

3. The autonomous driving control apparatus of claim 2, wherein the code further comprises instructions for the controller to cause the autonomous driving control apparatus to change the at least one control parameter in proportion to a performance improvement degree measured by the sensor device, the performance improvement degree being identified based on the sensor performance verification information.

4. The autonomous driving control apparatus of claim 1, wherein the code further comprises instructions for the controller to cause the autonomous driving control apparatus to:
identify whether the number of the second objects is greater than the second number, based on the identification information of the at least one object, wherein the second objects are identified as having a performance measured by the sensor device less than a threshold performance;
obtain the sensor performance verification information including information that the performance measured by the sensor device deteriorates, in response to identifying that the number of the second objects is greater than the second number; and
change the at least one control parameter based on the sensor performance verification information.

5. The autonomous driving control apparatus of claim 4, wherein the code further comprises instructions for the controller to cause the autonomous driving control apparatus to lower the minimum speed for starting the stopped object response control among the at least one control parameter, based on the sensor performance verification information.

6. The autonomous driving control apparatus of claim 1, wherein the code further comprises instructions for the controller to cause the autonomous driving control apparatus to:

identify whether a rain sensor or a wiper is activated and whether a notification indicating an icy state of a road is turned on, based on the driving performance verification information; and determine driving performance of the host vehicle as a first deterioration state and change the at least one control parameter by a first value, in response to the rain sensor or the wiper being activated and the notification being turned off, or in response to the rain sensor and the wiper being deactivated and the notification being turned on.

7. The autonomous driving control apparatus of claim 6, wherein the code further comprises instructions for the controller to cause the autonomous driving control apparatus to determine the driving performance of the host vehicle as a second deterioration state and change the at least one control parameter by a second value greater than the first value, in response to the rain sensor or the wiper being activated and the notification being turned on.

8. The autonomous driving control apparatus of claim 6, wherein the code further comprises instructions for the controller to cause the autonomous driving control apparatus to:

identify whether the host vehicle is driving in an accident occurrence caution section or is scheduled to drive in the accident occurrence caution section, using the driving performance verification information; and change the at least one control parameter during a driving section including the accident occurrence caution section and change a specified margin distance, in response to identifying that the host vehicle is driving in the accident occurrence caution section or is scheduled to drive in the accident occurrence caution section in a state in which the notification is turned on or the rain sensor or the wiper is activated.

9. The autonomous driving control apparatus of claim 6, wherein the code further comprises instructions for the controller to cause the autonomous driving control apparatus to:

identify required acceleration for control of the host vehicle and real-time acceleration of the host vehicle based on the driving performance verification information; and raise the minimum speed for starting the stopped object response control among the at least one control parameter, in response to an error between the required acceleration and the real-time acceleration and a convergence value of the real-time acceleration meeting a specified condition.

10. The autonomous driving control apparatus of claim 6, wherein the code further comprises instructions for the controller to cause the autonomous driving control apparatus to:

identify required acceleration for control of the host vehicle and real-time acceleration of the host vehicle based on the driving performance verification information; and lower the minimum speed for starting the stopped object response control among the at least one control parameter, in response to an error between the required acceleration and the real-time acceleration and a convergence value of the real-time acceleration not meeting a specified condition.

11. The autonomous driving control apparatus of claim 6, wherein the code further comprises instructions for the controller to cause the autonomous driving control apparatus to gradually restore the at least one control parameter to an initial parameter value, in response to identifying that sensor performance and the driving performance of the host vehicle being restored to correspond to initial performance, after adjusting the at least one control parameter for the driving control of the host vehicle.

12. The autonomous driving control apparatus of claim 1, wherein the identification information includes information about a recognition distance at which each of the at least one object is recognized, wherein the sensor performance verification information includes information about recognition performance, and wherein the driving performance verification information includes:

the internal information including information about whether a rain sensor or a wiper is activated;

the external information including information about a notification indicating an icy state of a road operates;

the geographic information including navigation information; and the driving information including required acceleration for driving control of the host vehicle and real-time acceleration of the host vehicle.

13. The autonomous driving control apparatus of claim 1, further comprising a notification device, and wherein the code further comprises instructions for the controller to cause the autonomous driving control apparatus to provide information using the notification device about one of or any combination of a performance state of the sensor device, the performance state being identified based on the sensor performance verification information, a driving state of the host vehicle, the driving state being identified based on the driving performance verification information, and a change in the at least one control parameter.

14. An autonomous driving control method, comprising:

obtaining sensor performance verification information based on identification information of at least one object identified;

obtaining driving performance verification information including one of or any combination of internal information of a host vehicle, external information of the host vehicle, geographic information of the host vehicle, and driving information of the host vehicle;

adjusting at least one control parameter for driving control of the host vehicle based on one of or both of the sensor performance verification information and the driving performance verification information, wherein adjusting the at least one control parameter based on the sensor performance verification information comprises raising a minimum speed for starting stopped object response control among the at least one control parameter, based on the sensor performance verification information;

identifying whether a number of first objects is greater than a first number and whether a number of second objects is greater than a second number, based on the identification information of the at least one object, wherein:

the first objects are identified as having a first performance greater than a first threshold performance, and the second objects are identified as having a second performance less than a second threshold performance; and maintaining the at least one control parameter in response to the number of the first objects being less than or equal to the first number and the number of the second objects being less than or equal to the second number.

15. The method of claim 14, further comprising:

identifying whether the number of the first objects is greater than the first number, based on the identification information of the at least one object, wherein the first objects are identified as having a measured performance greater than a threshold performance;

obtaining the sensor performance verification information including information that the measured performance is improved, in response to identifying that the number of the first objects is greater than the first number; and changing the at least one control parameter based on the sensor performance verification information.

16. The method of claim 14, further comprising:

identifying whether a rain sensor or a wiper is activated and whether a notification indicating an icy state of a road is turned on, based on the driving performance verification information; and determining driving performance of the host vehicle as a first deterioration state and changing the at least one control parameter by a first value, in response to the rain sensor or the wiper being activated and the notification being turned off, or in response to the rain sensor and the wiper being deactivated and the notification being turned on.

17. The method of claim 16, further comprising:

determining the driving performance of the host vehicle as a second deterioration state and changing the at least one control parameter by a second value greater than the first value, in response to the rain sensor or the wiper being activated and the notification being turned on.

* * * * *